United States Patent
Fang et al.

(10) Patent No.: US 10,649,078 B2
(45) Date of Patent: May 12, 2020

(54) METHOD AND SYSTEM FOR DETECTING GEOLOGICAL STRUCTURE OF AN EXTRATERRESTRIAL SOLID PLANET BY USING A SINGLE-TRANSMITTER AND MULTIPLE-RECEIVER RADAR

(71) Applicant: Institute of Electronics, Chinese Academy of Sciences, Beijing (CN)

(72) Inventors: Guangyou Fang, Beijing (CN); Yicai Ji, Beijing (CN); Bin Zhou, Beijing (CN); Qunying Zhang, Beijing (CN); Wei Lu, Beijing (CN); Shaoxiang Shen, Beijing (CN)

(73) Assignee: Institute of Electronics, Chinese Academy of Sciences, Beijing (CN)

( * ) Notice: Subject to any disclaimer, the term of this patent is extended or adjusted under 35 U.S.C. 154(b) by 553 days.

(21) Appl. No.: 15/114,193

(22) PCT Filed: Dec. 19, 2014

(86) PCT No.: PCT/CN2014/094373
§ 371 (c)(1),
(2) Date: Jul. 26, 2016

(87) PCT Pub. No.: WO2016/095208
PCT Pub. Date: Jun. 23, 2016

(65) Prior Publication Data
US 2017/0010351 A1    Jan. 12, 2017

(51) Int. Cl.
*G01S 13/88* (2006.01)
*G01V 3/12* (2006.01)
*G01S 13/00* (2006.01)

(52) U.S. Cl.
CPC .......... *G01S 13/885* (2013.01); *G01S 13/003* (2013.01); *G01S 13/88* (2013.01); *G01V 3/12* (2013.01)

(58) Field of Classification Search
CPC ... G01V 3/00; G01V 3/08; G01V 3/12; G01V 3/16; G01V 3/165; G01V 3/17;
(Continued)

(56) References Cited

U.S. PATENT DOCUMENTS 3,665,466 A * 5/1972 Hibbard ................ G01S 13/345
                                                    342/59
5,531,881 A    7/1996 Matsumura et al.
(Continued)

FOREIGN PATENT DOCUMENTS

CN    102012463 A    4/2011
CN    103197311 A    7/2013
(Continued)

OTHER PUBLICATIONS

Morales et al., Advanced Multifrequency Radar Instrumentation for Polar Research, 2013, IEEE Transactions on Geoscience and Remote Sensing, vol. 52, No. 5, pp. 2824-2840 (Year: 2013).*
(Continued)

*Primary Examiner* — Bernarr E Gregory
(74) *Attorney, Agent, or Firm* — Merchant & Gould P.C.

(57) ABSTRACT

A method and a system for detecting geological structure of an extraterrestrial solid planet by using a single-transmitter and multiple-receiver (STMR) radar are provided. The method comprises obtaining the detection of thickness distribution and geological structure of each geological layer on the extraterrestrial solid planet by using a STMR mode, and calculating information of the dielectric coefficients and the depth of the respective geological layer. There are two detection channels having different depths of detection and detection resolutions, in which a first channel operates in a HF/VHF band for detecting geological structure of rocks on the extraterrestrial solid planet, and a second channel operates in a UHF band for detecting geological structure of
(Continued)

regolith on the extraterrestrial solid planet. These two detection channels can cooperate with each other, ensuring accuracy and reliability of the detection.

13 Claims, 4 Drawing Sheets

(58) Field of Classification Search
CPC ......... G01V 3/38; G01S 13/00; G01S 13/003; G01S 13/46; G01S 13/88; G01S 13/885; G01S 2013/0236; G01S 2013/426; G01S 13/345
See application file for complete search history.

(56) References Cited

U.S. PATENT DOCUMENTS

| | | | |
|---|---|---|---|
| 5,835,053 A | | 11/1998 | Davis |
| 5,835,054 A | * | 11/1998 | Warhus .................... G01V 3/12 342/22 |
| 2003/0132873 A1 | * | 7/2003 | Berthelier ............... G01S 3/143 342/22 |
| 2012/0133543 A1 | * | 5/2012 | Al-Khalefah ............ G01S 7/03 342/22 |
| 2014/0125509 A1 | * | 5/2014 | Stolarczyk ................ G01S 7/35 342/22 |

FOREIGN PATENT DOCUMENTS

| | | | | |
|---|---|---|---|---|
| CN | 103278814 A | 9/2013 | | |
| CN | 103605127 A | 2/2014 | | |
| CN | 103630943 A | 3/2014 | | |
| CN | 104020470 | * | 9/2014 | ........... G01S 13/888 |

OTHER PUBLICATIONS

International Search Report for corresponding International Patent Application No. PCT/CN2014/094373 dated Sep. 25, 2015, 3 pgs.
Su, Y. et al., "Ground Validation Examination on Chang'e 3 Lunar Radar", Proceedings of the 10th National Lunar Science and Comaprative Planetology Meteoritics and Astrochemistry Symposium, (2012), 2 pgs, English Abstract.
Extended European Search Report for corresponding European Patent Application No. 14908243.0 dated Sep. 18, 2017, 11 pages.
Annan, A.P. et al., "Ground Penetrating Radar Survey Design", Sensors & Software, pp. 1-18 (Jan. 1999).
Huisman, J.A. et al., "Measuring Soil Water Content with Ground Penetrating Radar: A Review", Vadose Zone Journal, 2(4): 476-491 (Nov. 2003).
Leng, Z. et al., An innovative method for measuring pavement dielectric constant using the extended CMP method with two air-coupled GPR systems, NDT & E International, 66: 90-98 (Sep. 2014).

* cited by examiner

METHOD AND SYSTEM FOR DETECTING GEOLOGICAL STRUCTURE OF AN EXTRATERRESTRIAL SOLID PLANET BY USING A SINGLE-TRANSMITTER AND MULTIPLE-RECEIVER RADAR

This application is a National Stage Application of PCT/CN2014/094373, filed 19 Dec. 2014, and which application is incorporated herein by reference. A claim of priority is made to the above disclosed application.

TECHNICAL FIELD

The application relates to radar technology in electronics field, in particular, it relates to a method and a system for detecting geological structure of an extraterrestrial solid planet by using a single-transmitter and multiple-receiver (STMR) radar.

BACKGROUND

Since space technology has been mastered by mankind in 1950s, Europe and America have conducted a series of research on extraterrestrial planets including the Moon, Mars, Venus and satellites of Jupiter. However, information on geological structure and distribution of regolith thickness of the extraterrestrial planets is still poorly understood. More advanced detection device is required to explore the geological structure of regolith or rocks on the extraterrestrial planets, to study topographies of the extraterrestrial planets, to estimate the content of mineral resources, and to provide a scientific basis for researching the formation process and evolution history of the extraterrestrial planets.

To study the geological structure of the Moon, Apollo Lunar Sounder Experiment (ALSE) detection radar, a multi-band penetrating detection radar, has been carried by the Apollo-17 spacecraft in 1973. The ALSE radar include three detection bands which are HF1 band, HF2 band and VHF band respectively. The ALSE radar has completed a total 13 hours exploration and obtained the geological structure data of a depth of 1~2 km below the surface of the Moon. However, due to the limitations in electronic technology at that time, the radar has several shortcomings, mainly in pool signal quality, low signal-to-noise ratio, no phase information, narrow bandwidth, low depth resolution and short detection time and etc. For example, the depth resolution of the radar is about 150 m, which cannot distinguish the thickness distribution of the lunar regolith. In addition, since the radar data have been recorded on optical films, specific equipment developed by NASA is needed to read the data, which causing extreme difficulty in subsequent data processing. Till now, only a part of results from the shadow areas on the Moon have been published by NASA. From the published data, although ALSE radar is poor at discerning the composition and thickness of geological layers, these experiment results still provide important information for studying the Moon.

Japan developed a lunar spacecraft in the 1990s named Kaguya (SELENE), which carried the Lunar radar Sounder (LRS) used for detecting geological structure at depths of 4-5 km under the surface of the Moon. SELENE-LRS radar operated in a frequency range of 4-6 MHz, and transmitted chirp signal with a pulse width of 200 μs and pulse power of 800 W. The power consumption and weight were respectively 50 W and 24 kg. The antenna system consists of two dipole antennas crossed each other. One antenna is used to transmit an electromagnetic pulse signal, and both antennas are used to receive the echo signals from underground of the moon. SELENE-LRS is mainly utilized to detect geological structure that 1-5 km below the surface of the Moon. SELENE was launched on Sep. 14, 2007 with an orbital height of 100 km from the Moon. From Nov. 20, 2007, LRS radar began to work. The LRS radar system obtained data of the geological structure from hundreds of meters to kilometers below the lunar surface, but the resolution of geological layer was poor.

To detect geological structure of sub-surface layer under Mars and to detect whether there is water-ice structure in the surface on the Mars, European space agency launched Mars Express Orbiter in 2004 which carried MARSIS radar system. The MARSIS radar system worked at low frequency band with a central frequency of 1.5-5.5 MHz, and had narrow band and poor resolution. In order to compensate the resolution of the MARSIS radar system on detecting geological structure of a sub-surface layer, NASA launched the Mars Reconnaissance Orbiter (MRO) in August, 2005. The MRO carried a radar system named SHARAD which is similar to MARSIS radar system. However, since the SHARAD system had a higher frequency band (20 MHz) and a wider bandwidth (10 MHz), its resolution on detecting the geological structure of Mars is much higher than the MARSIS system.

However, in the procedure of practicing the disclosure, the applicant realizes that the ALSE radar, the MARSIS radar and the SHARAD radar described above all use a duplex antenna which has only one receiving channel, while the LRS radar uses a cross-polar antenna. These radars need to assume the dielectric constant previously to calculate the thickness of the sub-surface layer of the Moon and Mars, resulting in a large error. Further, these radar systems are all installed on an orbiter sent to the Moon or Mars, due to the limitation of the installation space and detection technology, the radars have narrow band and low detection resolution which are not sufficient to detect the geological structure and the thickness distribution of regolith on the Moon or Mars.

SUMMARY

According to an aspect of the disclosure, a method for detecting geological structure of an extraterrestrial solid planet by using a single-transmitter and multiple-receiver (STMR) radar is provided. The method may comprise: step A: emitting an electromagnetic pulse to underground of the extraterrestrial solid planet by a transmitting antenna $T_1$; step B: receiving an echo signal that reflected from a first geological interface by n receiving antennas ($R_1$, $R_2$, $R_3$), the first geological interface is an interface between a first geological layer and a second geological layer of the extraterrestrial solid planet, wherein n≥2; step C: establishing a pair of equations consisting of a first equation and a second equation according to data of the echo signal received by any one $R_j$ of the n receiving antennas ($R_1$, $R_2$, $R_3$), where the first equation is associated with a propagation time and a transmission speed of the electromagnetic pulse signal and a thickness of the first geological layer, and the second equation is associated with an incident angle and a refraction angle of the electromagnetic wave at an interface between the atmosphere and the first geological layer, and the transmission speed; establishing n pairs of equations according to the received data of the n receiving antennas; step D: For two of the n pairs of equations, constituting an equation set with four elements, to calculate a transmission speed $v_1$ of the electromagnetic pulse signal in the first geological layer and a thickness $D_1$ of the first geological layer; and step F:

calculating a dielectric coefficient $\varepsilon_1$ of the first geological layer by using the transmission speed $v_1$ of the electromagnetic pulse signal in the first geological layer.

According to another aspect of the disclosure, a system for detecting geological structure of an extraterrestrial solid planet by using a carrier-free pulse ultra-wideband radar system is provided. The system may comprise: a radar system controller, a first detection channel module, a second detection channel module and a data processing module, wherein the radar system controller is configured to control the operations of the first detection channel module and the second detection channel module; the first detection channel module is configured to operate in a first detection channel CH1, which is a single-transmitter and multiple-receiver system including one transmitting antenna and a plurality of receiving antennas; the second detection channel module is configured to operate in a second detection channel CH2, which is a single-transmitter and multiple-receiver system including one transmitting antenna and a plurality of receiving antennas; and the data processing system is configured to calculate a thickness $D_1$ and a dielectric coefficient $\varepsilon_1$ of a first geological layer of the extraterrestrial solid planet by using the above method, based on the data obtained by the first detection channel module and/or the second detection channel module.

REFERENCE SIGNS

100—radar system controller;
200—first detection channel module;
　　210—CH1 transmitter; 220—CH1 transmitting antenna;
　　231, 232, 233—CH1 receiving antennas;
　　240—CH1 receiver;
300—second detection channel module;
　　310—CH2 transmitter; 320—CH2 transmitting antenna;
　　331, 332, 333—CH2 receiving antennas;
　　340—CH2 receiver.

DETAILED DESCRIPTION

The foregoing and other objects, features and advantages will be apparent from the following description of particular embodiments of the present disclosure, as illustrated in the accompanying drawings in which like reference characters refer to the same parts throughout the different drawings. The drawings are not necessarily to scale, emphasis instead being placed upon illustrating the principles of various embodiments of the present disclosure. In addition, descriptions of well-known functions and constructions may be omitted for clarity and conciseness. Although exact values or ranges for specific parameters have been described in the embodiment, deviations or variations, including for example, tolerances, measurement error, measurement accuracy limitations and other factors known to those of skill in the art, may occur in amounts that do not preclude the effect the characteristic was intended to provide.

The present disclosure operates in a single-transmitter and multiple-receiver (STMR) mode; and can inverse the thickness and dielectric coefficient of materials of geological structure by using the theory of electromagnetic wave propagation, which may lead to high reliability. Furthermore, it should be noted that ultra-wideband is a term in the field of radars, which refers to the radar's operating band is 30% greater than of its central frequency.

A method and a system for detecting geological structure of an extraterrestrial solid planet by using a single-transmitter and multiple-receiver (STMR) radar are provided, for improving the accuracy of the geological measurement results.

First Embodiment

According to a first embodiment of the disclosure, a method for detecting geological structure of the Moon is provided. The method is based on a single-transmitter and three-receiver array consisting of 4 ultra-wideband antenna units.

Figure 1:
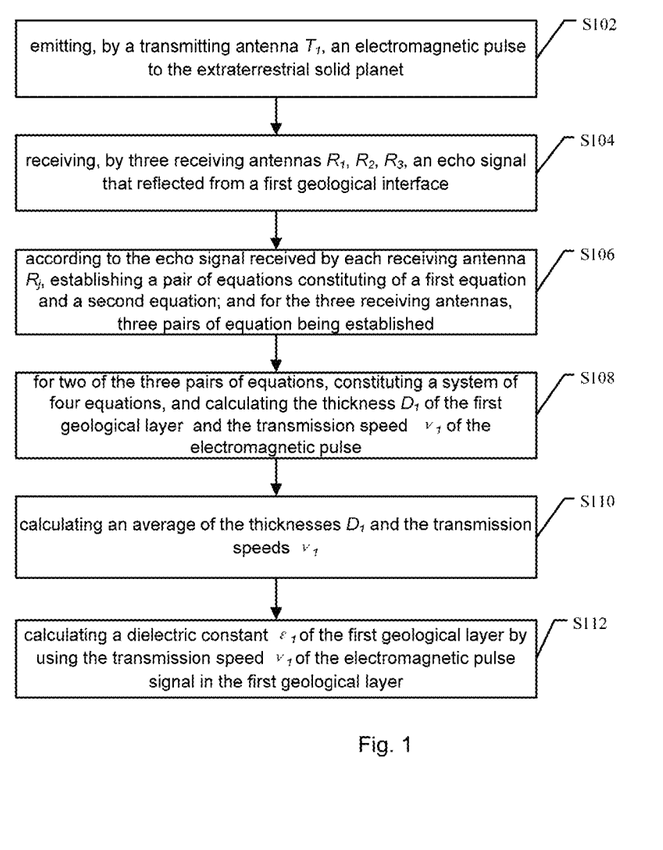
FIG. 1 is a flow chart of a method for detecting geological structure of the Moon by using a single-transmitter and tree-receiver radar according to a first embodiment of the disclosure.
Figure 2:
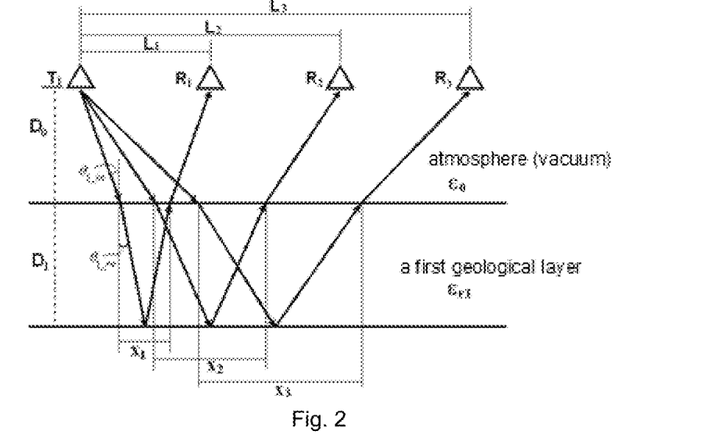
FIG. 2 is a diagram illustrating a reflection path and a refraction path between the atmosphere and a first geological layer of the radar wave in radar method shown in FIG. 1.

FIG. 1 is a flow chart of a method for detecting geological structure of the Moon by using a single-transmitter and three-receiver radar according to a first embodiment of the disclosure. FIG. 2 is a diagram illustrating a reflection path and a refraction path between the atmosphere and the first geological layer for the radar wave in radar method shown in FIG. 1. With reference to FIG. 1 and FIG. 2, in the present embodiment, a method for detecting geological structure of the Moon by using a single-transmitter and tree-receiver radar is provided, and the method may comprise:

Step S102: transmitting antenna $T_1$ emits an electromagnetic pulse signal to the underground of the Moon;

Step S104: receiving the echo signal that reflected from the first geological interface by three receiving antennas ($R_1$, $R_2$, $R_3$), the first geological interface is the interface between the first geological layer and the second geological layer of moon;

Step S106: according to the echo signal received by any one $R_j$ of the receiving antennas ($R_1$, $R_2$, $R_3$), establishing the first equation associated with a propagation time, a transmission speed of the electromagnetic pulse signal and a thickness of the first geological layer, as follows:

$$t_j = \frac{\sqrt{(L_j - x_j)^2 + 4D_0^2}}{c} + \frac{\sqrt{x_j^2 + 4D_1^2}}{v_1} \quad (1)$$

Meanwhile, establishing the second equation associated with the incident angle and the refraction angle of the electromagnetic wave on the interface between the atmosphere (vacuum) and a lunar regolith layer and the transmission speed, according to the reflection law, the refraction law and the Snell Law, as follows:

$$\frac{c}{v_1} = \frac{\sin\theta_{j\_in}}{\sin\theta_{j\_re}} = \frac{\frac{\sqrt{(L_j - x_j)^2 + 4D_0^2}}{L_j - x_j}}{\frac{x_j}{\sqrt{x_j^2 + 4D_1^2}}} \quad (2)$$

where $t_j$ indicates the propagation time that from the electromagnetic pulse signal emitted by the transmitting antenna $T_1$ to the signal that arrives at the receiving antenna $R_j$ after being reflected at the interface between the lunar regolith layer and the second geological layer; $L_j$ indicates the distance between the transmitting antenna $T_1$ and the receiving antenna $R_j$; $x_j$ indicates the distance between the incident point and the eye point for the electromagnetic pulse signal emitted by the transmitting antenna $T_1$ and received by the receiving antenna $R_j$ at the interface between the atmosphere and the lunar regolith layer; $D_0$ indicates the distance from the single-transmitter and three-receiver antenna array to the surface of the lunar regolith layer; $D_1$ indicates a thickness for the lunar regolith layer; c indicates the light speed; $v_1$ indicates the transmission speed of the electromagnetic pulse signal in the lunar regolith layer. $t_j$, $L_j$, c and $D_0$ are known quantities, while $x_j$, $D_1$ and $v_1$ are unknown quantities.

It should be noted that three receiving antennas have been used in this embodiment, thus three pairs of equations such as equation (1) and (2) can be established. However, if there are n receiving antennas in a system, n pairs of equations such as equation (1) and (2) can be established, which will not be discussed in details. Preferably, n=3, 4, 5 or 6.

Step S108: for two of the three pairs of equations, constituting an equation set with four elements, and calculating the transmission speed $v_1$ of the electromagnetic pulse signal in the lunar regolith layer and the thickness $D_1$ of the lunar regolith layer from the set of equations;

For a system having n pairs of receiving antennas, since n pairs of equations can be established, $C_n^2$ equation sets can be obtained, which may lead to $C_n^2$ transmission speeds v and thicknesses $D_1$, wherein the transmission speeds and thicknesses are all calculated for the electromagnetic pulse signal in the lunar regolith layer.

Step S110: for the plurality calculated results of transmission speeds $v_1$ and thicknesses $D_1$ for the electromagnetic pulse signal, average method is used to calculate the thicknesses $D_1$ and transmission speeds $v_1$;

Step S112: calculating a dielectric coefficient $\varepsilon_1$ of the lunar regolith layer by using the transmission speed $v_1$ of the electromagnetic pulse signal in the lunar regolith layer:

$$\varepsilon_1 = \varepsilon_0 \varepsilon_{r1} = \varepsilon_0 (c/v_1)^2 \quad (3)$$

After calculating the thickness and the dielectric coefficient of the lunar regolith layer, establishing equations associated with propagation times for the electromagnetic wave in the first geological layer and the second geological layer and the distance between the first and the second geological layer similarly. From which, the thickness $D_2$ and the dielectric coefficient $\varepsilon_2$ of the second geological layer can be calculated. Likewise, the thicknesses and the dielectric coefficients of geological structure for each of underground layers (including regolith and rocks) which are within a detection depth can be calculated one by one.

Specially, after Step S112, the method may further comprise:

n receiving antennas ($R_1$, $R_2$, $R_3$) receive the echo signal reflected from the $i^{th}$ geological interface, where, the $i^{th}$ geological interface is the interface between the $i^{th}$ geological layer and a i+1$^{th}$ geological layer on the Moon, wherein i≥2;

according to the thicknesses and the dielectric coefficients of the first geological layer to a i-1$^{th}$ geological layer, and the echo signal received by any one $R_j$ of the n receiving antennas ($R_1$, $R_2$, $R_3$), establishing a pair of equations consisting of two equations, where the first equation is associated with the propagation time, the transmission speed of the electromagnetic pulse signal and the thickness of the $i^{th}$ geological layer, and the second equation is associated with the incident angle and refraction angle of the electromagnetic pulse signal at the $i^{th}$ interface and the transmission speed, thus, n pairs of equations are established for the n receiving antennas;

For two of the n pairs of equations, constituting a system of four equations, and accordingly constituting $C_n^2$ systems of equations, each of which has four equations. From one of the $C_n^2$ systems of equations, the transmission speed $v_i$ of the electromagnetic pulse signal in the $i^{th}$ geological layer and the thickness $D_i$ of the $i^{th}$ geological layer can be calculated;

For the $C_n^2$ calculated transmission speeds $v_i$ in the $i^{th}$ geological layer and the thicknesses $D_i$ of the $i^{th}$ geological layer, calculating the average values of the thickness $D_i$ and the transmission speed $v_i$;

calculating the dielectric coefficient $\varepsilon_i$ of the $i^{th}$ geological layer by using the transmission speed $v_i$ of the electromagnetic pulse signal in the $i^{th}$ geological layer.

According to the above method, the embodiment can obtain the depth and the thickness of lunar regolith and rocks in each of the geological layers within the detection depth.

The present embodiment operates in a single-transmitter and three-receiver mode, which can extract respective transmission speeds of the pulsed wave in each of geological layers on the Moon and calculate the thickness and the dielectric coefficient of each geological layer accurately.

It should be noted that although the present embodiment describes the exploration for geological structure of the Moon as an example, other extraterrestrial solid planets, such as minor planet, Mars, Venus, satellites of Jupiter and mini-satellites of Jupiter (for example, Himalia), could also be explored by the embodiment.

Second Embodiment

Based on the method for detecting geological structure of the Moon using a STMR radar according to the first embodiment of the disclosure, in the second embodiment of the disclosure, an ultra-wideband carrier-free pulse radar system used for exploration on the Moon is provided. The ultra-wideband carrier-free pulse radar system has two detection channels, the first detection channel CH1 and the second detection channel CH2. The first detection channel CH1 has a wider transmission band, which covers HF/VHF/UHF bands, while its receiving band only covers HF/VHF bands. The second detection channel CH2 has a relatively small transmission band, which only covers a UHF band as the same as a receiving band. As known, HF/VHF bands can be used to detect geological structure of the sub-surface layer on the Moon, while the UHF band can detect the thickness of the lunar regolith layer on the surface of the Moon accurately.

Figure 3:
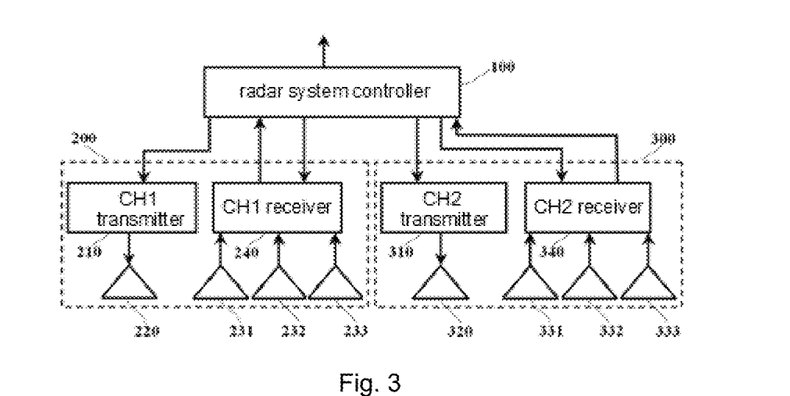
FIG. 3 shows a block diagram illustrating an ultra-wideband carrier-free pulse radar system.

The ultra-wideband carrier free pulse radar system include: a radar system controller 100, the first detection channel module 200, the second detection channel module 300 and a data processing system. The first detection module 200 may operate in the first detection channel CH1, and the second detection module 300 may operate in the second detection channel CH2.

In normal state, the receiver in the second detection channel module may receive the echo signal that was emitted by the transmitter in the second detection channel module 300. In an abnormal state, when the transmitter or transmitting antenna in the second detection channel module break down, the transmitter or transmitting antenna in the first detection channel module will function instead. Since the transmitter and transmitting antenna in the first detection channel module have a wider band, in the echo signal, a signal in a HF/VHF band will be received by receivers and receiving antennas in the first detection channel module, while a signal in a UHF band will be received by receivers and receiving antennas in the second detection channel module, leading to an improvement of the reliability of the second detection channel.

The radar system controller 100 is installed inside the lunar rover. The lunar rover is programmed to travel along a path set by a command inputted at ground. The radar system controller 100 is mainly intended to perform the following operations:

(1) providing a power supply for various components of the first detection channel module 200 and the second detection channel module 300;

(2) setting up parameters for the first detection channel module 200 and the second detection channel module 300;

(3) emitting a triggering signal to the transmitter in the first detection channel module 200 or the second detection channel module 300, and controlling the operation of the transmitter;

(4) controlling the operations of the receivers in the first detection channel and the second detection channel, for achieving a high speed sampling of echo signals of CH1 and CH2; data communicating with the integrated electronic system of the rover via a bus interface circuit; storing the echo signals received by CH1 and CH2 to a storage, and reading the echo signals of CH1 and CH2 from the storage and transfer the echo signals to the integrated electronic system of the rover. Furthermore, in the radar system controller, the echo signals are superimposed in time to remove random noises, decreasing the data amount to be transferred.

FIG. 3 shows a block diagram illustrating an ultra-wideband carrier-free pulse radar system. As shown in FIG. 3, the first detection channel module 200 may include: a CH1 channel transmitter 210, a CH1 channel transmitting antenna 220, three CH1 channel receiving antennas (231, 232, 233) and a CH1 channel receiver 240. The CH1 channel receiver 240 is a three-channel receiver. The CH1 channel transmitter 210 and CH1 channel transmitting antenna 220 constitute a transmitting channel of the first detection channel module, and the three CH1 channel receiving antennas (231, 232, 233) and the CH1 channel receiver 240 constitute the three receiving channels of the first detection channel module.

The second detection channel module 300 may include: a CH2 channel transmitter 310, a CH2 channel transmitting antenna 320, three CH2 channel receiving antennas (331, 332, 333) and a CH2 channel receiver 340. The CH2 channel receiver 340 is a three-channel receiver. The CH2 channel transmitter 310 and CH2 channel transmitting antenna 320 constitute a transmitting channel of the second detection channel module, and the three CH2 channel receiving antennas (331, 332, 333) and the CH2 channel receiver 340 constitute the three receiving channels of the second detection channel module.

The CH1 channel transmitting antenna, the three CH1 channel receiving antennas, the CH2 channel transmitting antenna and the three CH2 channel receiving antennas are all ultra-wideband antennas. Although the numbers of receiving channels in the first detection channel module and the second detection channel module are the same in the described embodiment, the disclosure is not limited thereto. The numbers of receiving channels in the first detection channel module and the second detection channel module may be the same or be different.

The system according to the present embodiment operates in a STMR mode. For the first detection channel module and the second detection channel module, there are a plurality of receiving channels. When one of the plurality of receiving channels breaks down, other receiving channels will carry on the experiments, which will improve the reliability of the system.

In the embodiment, the CH1 channel transmitter and the CH1 channel receiver of the first detection channel module, and the CH2 channel transmitter and the CH2 channel receiver of the second detection channel module may be installed inside the lunar rover, while a plurality of ultra-wideband antennas including one CH1 channel transmitter antenna, three CH1 channel receiving antennas, one CH2 channel transmitter antenna and the three CH2 channel receiving antennas may be installed outside the rover.

The signal emitted by the CH1 channel transmitter is a Gaussian pulse signal, which has an amplitude of 1000V and a pulse width of 8 ns; and the signal emitted by the CH2 channel transmitter is also a Gaussian pulse signal, which has an amplitude of 400V and a pulse width of 2 ns. The operation frequency of the CH1 channel transmitting antenna is 30~750 MHz, the operation frequency of the three CH1 channel receiving antennas is 30~90 MHz, and the operation frequencies of the CH2 channel transmitting antenna and the three CH2 channel receiving antennas are 250~750 MHz.

The CH1 channel transmitter 210 is connected to the radar system controller 100 and the CH1 channel transmitting antenna 220, and output an electromagnetic pulse signal at a HF/VHF/UHF band under the control of the radar system controller 100. The electromagnetic pulse signal is transferred to the CH1 channel transmitting antenna 220 and radiated to the sub-surface layer on the Moon. In normal mode, when the electromagnetic pulse signal encounters the inhomogeneous media, an echo signal will be generated and will be received by the CH1 channel receiving antennas and transferred to the CH1 channel receiver only. In abnormal state, when the transmitter and/or transmitting antenna in the second detection channel module 300 break down, the echo signal will be received by the CH1 channel receiving antennas and the CH2 channel receiving antennas simultaneously, and transferred to the CH1 channel receiver and the CH2 channel receiver respectively.

The CH1 channel receiver 240 is a three-channel receiver that connected to the radar system controller 100 and the three CH1 channel receiving antennas (231, 232, 233). Under the control of the radar system controller 100, the CH1 channel receiver 240 is used to receive the echo signal received by the three CH1 channel receiving antennas (231, 232, 233).

The CH2 channel transmitter 310 is connected to the radar system controller 100 and the ultra-wideband antenna 320, and outputs an UHF ultra-wideband carrier free pulse signal under the control of the radar system controller 100 and transfers it to the ultra-wideband antenna 320 for radiating to the sub-surface layer on the Moon. In normal mode, an echo signal will be received by the CH2 receiving antennas and transferred to the CH2 channel receiver.

The CH2 channel receiver 340 is a three-channel receiver that connected to the radar system controller 100 and the three ultra-wideband receiving antennas (331, 332, 333). Under the control of the radar system controller 100, the CH2 channel receiver 340 is used to receive the echo pulse signal received by the three ultra-wideband receiving antennas.

In the ultra-wideband carrier-free pulse radar system according to the embodiment of the disclosure:

(1) In normal state, the CH1 channel transmitter can transmit a signal at HF/VHF/UHF band, and the three CH1 channel receiver will receive echo signals of CH1 channel that encounter with inhomogeneous media in the lunar regolith and the rocks in sub-surface layer on the Moon simultaneously; and the CH2 channel transmitter transmit a signal at a UHF band, and the three CH2 channel receiver will receive echo signals of CH2 channel that encounter with an inhomogeneous media in the lunar regolith and the rocks in sub-surface layer on the Moon.

(2) In abnormal state, in a case that the transmitter and/or transmitting antenna in the second detection channel module break down, since the transmitter and transmitting antenna in the first detection channel module have a wider band, in the echo signal, a signal in HF/VHF band will be received by receiver and receiving antennas in the first detection channel module, and a signal in a UHF band will be received by receivers and receiving antennas in the second detection channel module, leading to an improvement of the reliability of the second detection channel.

In both of the first detection channel and the second detection channel, the transmitting antenna is used to emit a carrier-free pulse signal, and the receiving antennas are used to receive an echo signal reflected by the lunar regolith and rocks in the sub-surface layer on the Moon.

Figure 4:
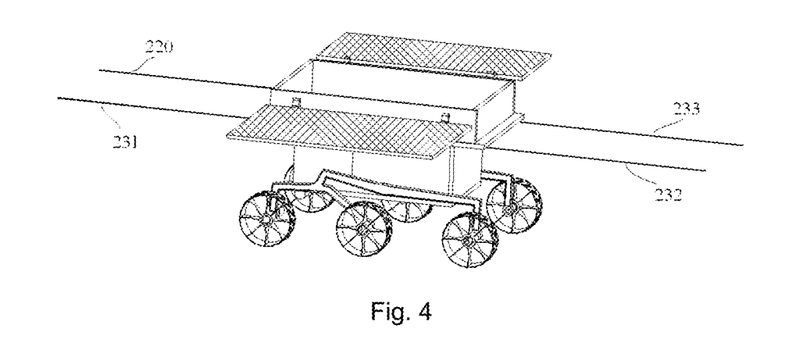
FIG. 4 is a diagram illustrating a transmitting antenna and receiving antennas which are in an expanded state, of a first detection channel of the ultra-wideband carrier-free pulse radar system according to the present embodiment.

FIG. 4 is a diagram illustrating a transmitting antenna and receiving antennas which are in an expanded state, of the first detection channel of the ultra-wideband carrier-free pulse radar system according to the present embodiment. As shown in FIG. 4, the transmitting antenna 220 and the receiving antennas (231, 232, 233) are all ultra-wideband monopole antennas, which are installed at the head and the tail of the rover. The transmitting antenna 220 is used to transmit a pulse signal, and the receiving antennas (231, 232, 233) are utilized to receive the echo signal reflected from the sub-surface layer on the Moon and transfer it to the CH1 channel receiver (340). The transmitting antenna 220 and the receiving antennas (231, 232, 233) are all compacted and compressed at the surface of the lunar rover when launching the satellite, and then expanded according to an instruction at ground after the satellite arriving at the surface of the Moon. The transmitting antenna 220 and the receiving antennas (231, 232, 233) may operate at a frequency of 30~90 MHz with a Voltage Standing Wave Ratio (VSWR) being less than 3.0.

Figure 5:
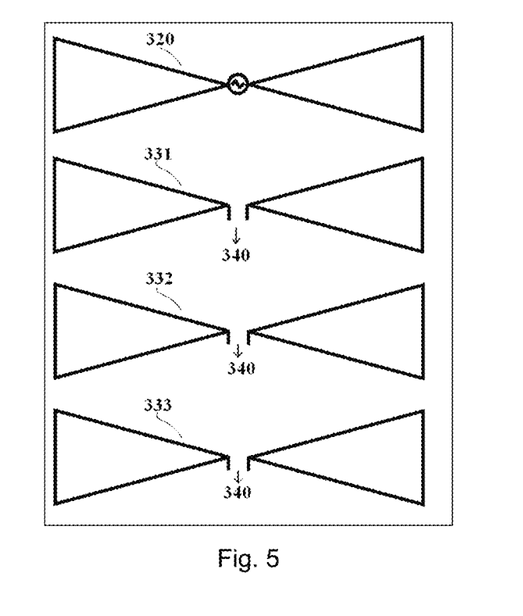
FIG. 5 is a diagram illustrating a transmitting antenna and receiving antennas of a second detection channel of the ultra-wideband carrier-free pulse radar system according to the present embodiment.

FIG. 5 is a diagram illustrating a transmitting antenna and receiving antennas of the second detection channel of the ultra-wideband carrier-free pulse radar system according to the present embodiment. As shown in FIG. 5, the CH2 channel transmitting antenna 320 and the CH2 channel receiving antennas (331, 332, 333) are all triangular dipole antennas which are attached to the bottom of the rover. The transmitting antenna 220 is used to transmit a pulse signal, and the receiving antennas (331, 332, 333) will receive the echo signal reflected from the sub-surface layer on the Moon and transfer it to the CH2 channel receiver (310). In order to improve the performance on unidirectional radiation of the ultra-wideband antennas (331, 332, 333), a metallic reflection cavity may be installed at the back of the antenna array with an opening downward, wherein the height of the metallic reflection cavity is about 0.15 m. The CH2 channel transmitting antenna 320 and the CH2 channel receiving antennas (331, 332, 333) may operate at a frequency of 250~750 MHz with a VSWR being less than 2.0.

In the embodiment, a triangular dipole antenna with two triangular-shaped radiation arms is used, however, the disclosure is not limited thereto. The disclosure may use other types of dipole antennas, such as circular, semi-circular, elliptical, semi-elliptical, water-drop and etc. Furthermore, the quality of the emitted pulse signal may be improved by loading a resistor.

The data processing system may be arranged on the lunar rover, or on the earth. In consideration of desires of reducing loads on the lunar rover and performances of the data processing system, the data processing system is preferably arranged on the earth.

The data processing system may utilize the echo data obtained by the first detection channel module and the second detection channel module to calculate the thickness and the dielectric constant for each lunar regolith layer under the surface on the Moon by using the method according to the first embodiment. Specifically, the functions of the data processing system may include: establishing three pairs of equations associated with the propagation time, the transmission speed, the incident angle, the refraction angle and the thickness of the lunar regolith, according to the data from the transmitting channel and three receiving channels in the first detection channel module or the second detection channel module; for two of the three pairs of equations, constituting an equation set with four elements, from which the transmission speed $v_1$ of the electromagnetic pulse signal in the lunar regolith layer and the thickness $D_1$ of the lunar regolith layer can be calculated; for a plurality of the calculated transmission speeds $v_1$ and thicknesses $D_1$ for the electromagnetic pulse signal, accurate thicknesses $D_i$ and transmission speeds $v_i$ can be calculated by the average method; and calculating the dielectric coefficient $\varepsilon_1$ of the lunar regolith layer by using the transmission speed $v_1$. Then, the thicknesses and the dielectric coefficients of geological structure for each underground layer can be calculated in turn.

Figure 6:
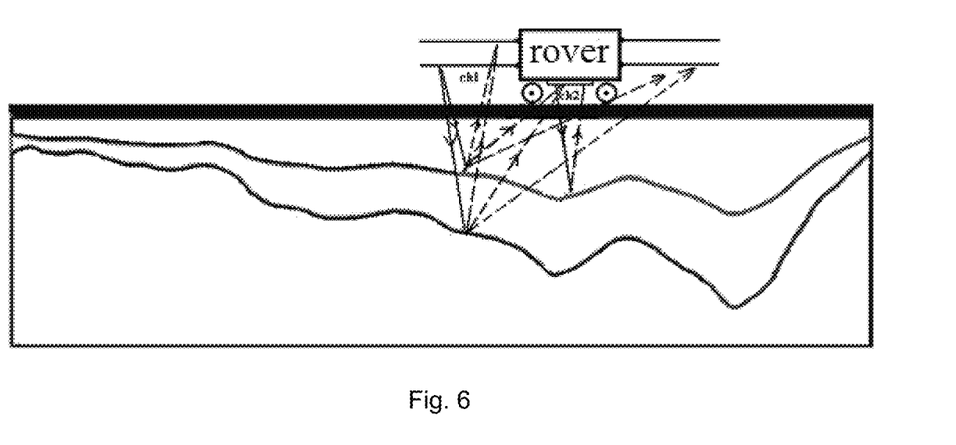
FIG. 6 is a diagram illustrating the method of detecting geological structure by using a radar according to a third embodiment of the present invention.

In the embodiment, the two detection channels operate alternatively, including transmitting and receiving an ultra-wideband carrier-free pulse signal individually, and detecting the thickness of the lunar regolith layer and the geological structure of the sub-surface layer on the Moon individually. FIG. 6 is a diagram illustrating the process of detecting geological structure by using an ultra-wideband carrier-free pulse radar system according to the second embodiment of the present invention. With respect to FIG. 6, the process may include:

Step S602: the CH1 channel transmitter may generate an ultra-wideband carrier-free pulse signal, and feed the signal to the CH1 channel transmitting antenna which may radiate the signal to the sub-surface layer on the Moon, wherein an echo signal may be generated at a discontinuous location in the sub-surface layer on the Moon;

Step S604: the three CH1 channel receiving antennas may receive a part of the echo signal which is in a HF/VHF band, and the three CH1 channel receiver may collect the echo signal from the three CH1 channel receiving antennas, convert the collected pulse signal into a digital signal after performing operations for amplifying and sampling the echo signal; and store the digital signal into a storage on the rover;

Step S606: determining whether the CH2 channel transmitter and the CH2 channel transmitting antenna are operating properly or not. If so, perform step S608, otherwise perform step S612;

Step S608: the CH2 channel transmitter may generate an ultra-wideband carrier-free pulse signal, and feed the signal to the CH2 channel transmitting antenna which may radiate the signal to the surface regolith layer, wherein an echo signal may be generated at a discontinuous location in the surface regolith;

Step S610: the three CH2 channel receiving antennas may receive the echo signal, and the CH2 channel receiver may collect the echo signal from the three CH2 channel receiving antennas, convert the collected pulse signal into a digital signal after performing operations for amplifying and sampling the echo signal; store the digital signal into a storage on the rover; and perform step S614;

Step S612: the CH1 transmitting channel begins to work, the three CH2 channel receiving antennas may receive a part of the echo signal which is in UHF band, wherein the echo signal is generated by the ultra-wideband signal radiated from the CH1 channel. Then, the CH2 channel receiver may collect the echo signal from the three CH2 channel receiving antennas, convert the collected pulse signal into a digital signal after performing operations for amplifying and sampling the echo signal; store the digital signal into a storage on the rover; and perform step S614;

Step S614: while the lunar rover moves along a predetermined path, repeating Steps S602~S608, until the lunar rover arrives the end of the predetermined path, thereby completing the exploration of the geological structure of the sub-surface layer on the Moon along the predetermined path;

Step S616: the lunar rover may transfer the data to the data processing system on the earth. In the data processing system, the thickness and the dielectric constant for each lunar regolith layer under the surface on the Moon can be calculated by using the method according to the first embodiment. Finally, a cross-sectional view of the geological structure of the sub-surface layer on the Moon and the lunar regolith layer along the predetermined path can be drawn.

Figure 7:
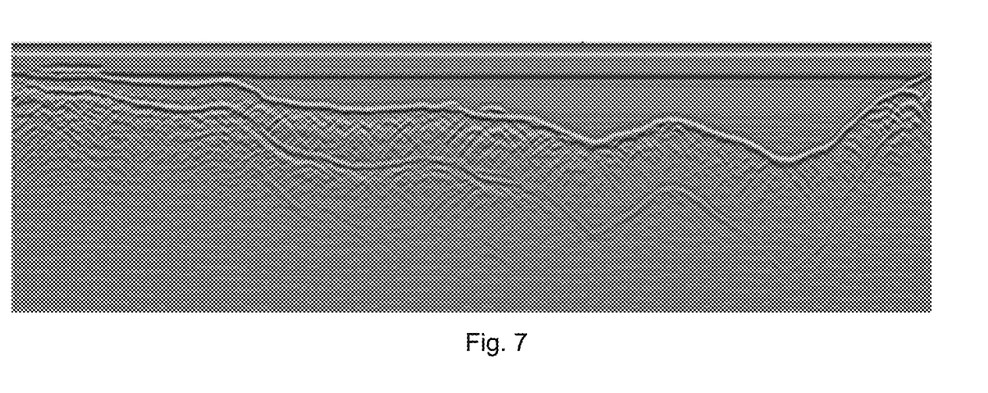
FIG. 7 is a cross-sectional view of geological structure of a sub-surface layer and the lunar regolith, which are displayed in a gray level, after processing radar echo data.

FIG. 7 is a cross-sectional view of geological structure of a sub-surface layer and the lunar regolith, which are displayed in a gray level after data processing. The cross-sectional view of geological structure of a sub-surface layer and the lunar regolith is clearly shown in FIG. 7, which is more clearly and more accurate than cross-sectional views obtained by existing technology.

It should be noted that although the present embodiment describes the exploration for geological structure of the Moon as an example, other extraterrestrial solid planets, such as minor planet, Mars, Venus, satellites of Jupiter and mini-satellites of Jupiter (for example, Himalia) can also be used in the embodiment.

Two embodiments of the disclosure have been described in details with reference to the drawings. The method and system of detecting geological structure by using a single-transmitter and multiple-receiver radar according to the disclosure may be well understood by those skilled in the art based on the above description.

It should be noted that the definitions of various component is not limited to the specific structures or shapes mentioned in the embodiments, and can be easily replaced by those skilled in the art.

In view of above, the present disclosure provides a method and a system for detecting the regolith thickness and the geological structure of the sub-surface layer on the Moon, by using a single-transmitter and multiple-receiver (STMR) radar. By using the method and the system, the properties of the geological structure of the lunar regolith and the sub-surface layer on the Moon can be obtained, dielectric coefficients of the lunar regolith and the sub-surface layer on the Moon can be inversed to estimate the content of mineral resources. The present disclosure has significant scientific meaning in studying the lunar geology, formation and evolution of the moon.

According to various embodiments of the disclosure, a method and a system for detecting geological structure of an extraterrestrial solid planet by using a STMR radar can be provided. The method or the system according to various embodiments of the disclosure can provide at least one of following advantages:

(1) Operating in a STMR mode; the thickness $D_1$ and the dielectric coefficient $\varepsilon_1$ of the layered structure of rocks and soil of the extraterrestrial solid planet can be inversed accurately by using electromagnetic wave propagation theory;

(2) Using two detection channels including the first detection channel CH1 and the second detection channel CH2, in which the first detection channel CH1 operates in a HF/VHF band, and the depth of detection is over 100 meters, and its depth resolution is several meters; and the second detection channel CH2 operates in a UHF band, the depths of detection is over 30 meters, and its depth resolution is less than 30 cm. These two detection channels work together, ensuring the accuracy and the reliability of the detection;

(3) Using a ultra-wideband (UWB) carrier-free pulse radar; it has many advantages, including wide operating bandwidth, light weight, high accuracy and no damage in the geological structure of the extraterrestrial solid planet; these advantages can meet the requirements for detecting the thicknesses of a surface layer of the extraterrestrial solid planet and the geological structure of a sub-surface layer;

(4) Detecting the thickness of the surface layer of the extraterrestrial solid planet and the geological structure of the sub-surface layer by the radar mounted on a rover, which can achieve a high resolution.

While the objects, features and effects of the present disclosure has been shown and described in detail with reference to various embodiments thereof, it will be understood by those skilled in the art that various changes in form and details may be made therein without departing from the spirit and scope of the present disclosure as defined by the appended claims and their equivalents.

We claim:

1. An ultra-wideband carrier-free pulse radar system for detecting geological structures of an extraterrestrial solid planet, including a radar system controller, a first detection channel module, a second detection channel module and a data processing system, wherein:

the radar system controller is configured to control operations of the first detection channel module and the second detection channel module;

the first detection channel module is configured to operate in a first detection channel CH1; the first detection channel module is a single-transmitter and multiple-receiver system including one transmitting antenna and a plurality of receiving antennas; and the second detection channel module is configured to operate in a second detection channel CH2; the second detection channel module is a single-transmitter and multiple-receiver system including one transmitting antenna and a plurality of receiving antennas; and wherein the data processing system is configured to control the transmitting antenna in the first detection channel module or the second detection channel module to emit an electromagnetic pulse signal to underground of the extraterrestrial solid planet;

control n receiving antennas of the plurality of receiving antennas in the first detection channel module or the second detection channel module to receive an echo signal that reflected from a first geological interface, the first geological interface is an interface between the first geological layer and a second geological layer of the extraterrestrial solid planet, wherein n≥2;

establish a pair of equations consisting of a first equation and a second equation according to the echo signal received by a receiving antenna $R_j$ of the n receiving antennas, wherein the first equation is associated with a propagation time and a transmission speed of the electromagnetic pulse signal and a thickness of the first geological layer, and the second equation is associated with an incident angle and a refraction angle of the electromagnetic pulse signal at an interface between atmosphere or vacuum and the first geological layer, and a transmission speed of the electromagnetic pulse signal in the interface between atmosphere or vacuum and the first geological layer; and establishing n pairs of equations for the respective data received by n receiving antennas;

for two of the n pairs of equations, constitute a system of four equations, from which a transmission speed $v_1$ of the electromagnetic pulse signal in the first geological layer and a thickness $D_1$ of the first geological layer are calculated; and calculate a dielectric constant $\varepsilon_1$ of the first geological layer by using the transmission speed $v_1$ of the electromagnetic pulse signal in the first geological layer;

wherein the first detection channel CH1 has a transmission band covering HF/VHF/UHF bands and a receiving band only covering HF/VHF bands; and the second detection channel CH2 has a transmission band only covering a UHF band and a receiving band only covering a UHF band.

2. The ultra-wideband carrier-free pulse radar system of claim 1, wherein the first detection channel module includes a CH1 channel transmitter, a CH1 channel transmitting antenna, J CH1 channel receiving antennas and a CH1 channel receiver having J channels, wherein the CH1 channel transmitter and the CH1 channel transmitting antenna function as a transmitting channel of the first detection channel module, and the J CH1 channel receiving antennas and the CH1 channel receiver function as J receiving channels of the first detection channel module; and the second detection channel module includes: a CH2 channel transmitter, a CH2 channel transmitting antenna, K CH2 channel receiving antennas and a CH2 channel receiver having K channels, wherein the CH2 channel transmitter and the CH2 channel transmitting antenna function as a transmitting channel of the second detection channel module, and the K CH2 channel receiving antennas and the CH2 channel receiver function as K receiving channels of the second detection channel module.

3. The ultra-wideband carrier-free pulse radar system of claim 2, wherein in a normal mode, the CH1 channel transmitting antenna transmits an electromagnetic pulse signal at a HF/VHF/UHF band, and the CH1 channel receiver having J channels receives an echo signal which is in a HF/VHF band, wherein the echo signal is a reflected signal reflected at the first geological interface; and the CH2 channel transmitting antenna transmits an electromagnetic pulse signal at a UHF band, and the CH2 channel receiver having K channels receives an echo signal reflected at the first geological interface;

when the transmitter and/or transmitting antenna in the second detection channel module break down, since the electromagnetic pulse signal transmitted by the transmitter or transmitting antenna in the CH1 detection channel module is in a HF/VHF/UHF band, in the echo signal that reflected at the first geological interface, the echo signal in HF/VHF band is received by the CH1 channel receiving antennas and the CH1 channel receiver in the first detection channel module, and the echo signal in UHF band is received by the CH2 channel receiving antennas and the CH2 channel receiver in the second detection channel module.

4. The ultra-wideband carrier-free pulse radar system of claim 2, wherein the transmitting antenna and the J CH1 receiving antennas in the first detection channel module are ultra-wideband monopole antennas.

5. The ultra-wideband carrier-free pulse radar system of claim 2, wherein the CH2 channel transmitting antenna and the K CH2 channel receiving antennas are all ultra-wideband dipole antennas which are attached to the bottom of an rover.

6. The ultra-wideband carrier-free pulse radar system of claim 2, wherein:

the CH1 channel transmitting antenna in the first detection channel module has an operation frequency of 30-750 MHz, and the J CH1 channel receiving antennas have an operation frequency of 30-90 MHz and a Voltage Standing Wave Ratio (VSWR) less than 3.0; and the CH2 channel transmitting antenna and the K CH2 channel receiving antennas in the second detection channel module have an operation frequency of 250-750 MHz and a VSWR less than 2.0.

7. The ultra-wideband carrier-free pulse radar system of claim 1; wherein n≥3; the data processing system is further configured to constitute $C_n^2$ systems of equations, each of which has four equations, and from any one of the $C_n^2$ systems of equations, calculate the transmission speed $v_1$ of the electromagnetic pulse signal in the first geological layer and the thickness $D_1$ of the first geological layer;

after these $C_n^2$ systems of equations are handled, $C_n^2$ groups of transmission speeds $v_1$ and thicknesses D1 are obtained, then calculate an average of the transmission speeds v1 and the thicknesses D1.

8. The ultra-wideband carrier-free pulse radar system of claim 1, wherein for a receiving antenna $R_j$:

the first equation is as follows:

$$t_j = \frac{\sqrt{(L_j - x_j)^2 + 4D_0^2}}{c} + \frac{\sqrt{x_j^2 + 4D_1^2}}{v_1}$$

the second equation is as follows:

$$\frac{c}{v_1} = \frac{\frac{L_j - x_j}{\sqrt{(L_j - x_j)^2 + 4D_0^2}}}{\frac{x_j}{\sqrt{x_j^2 + 4D_1^2}}};$$

wherein $t_j$ indicates the propagation time that from the electromagnetic pulse signal emitted by the transmitting antenna $T_1$ to the echo signal that arrives at the receiving antenna $R_j$ after being reflected at the interface between the first geological layer and the second geological layer; $L_j$ indicates a distance between the transmitting antenna $T_1$ and the receiving antenna $R_j$; $x_j$ indicates a distance between an incident point and an emergent point for the electromagnetic pulse signal emitted by the transmitting antenna $T_1$ and received by the receiving antenna $R_j$ at the interface between the atmosphere and the first geological layer $D_0$ indicates the distance from the single-transmitter and three-receiver antenna array to the surface of the regolith layer; $D_1$ indicates a thickness for first geological layer; c indicates a light speed; $v_1$ indicates the transmission speed of the electromagnetic pulse signal in the first geological layer.

9. The ultra-wideband carrier-free pulse radar system of claim 1, wherein the dielectric constant $\varepsilon_1$ of the first geological layer is calculated as follows:

$$\varepsilon_1 = \varepsilon_0 \left(\frac{c}{v_1}\right)^2.$$

10. The ultra-wideband carrier-free pulse radar system of claim 1,
n receiving antennas ($R_1$, $R_2$, $R_3$) receiving the echo signal reflected from the $i^{th}$ geological interface, wherein, the $i^{th}$ geological interface is the interface between the $i^{th}$ geological layer and a $i+1^{th}$ geological layer on the extraterrestrial solid planet, wherein $i \geq 2$;
the data processing system is further configured to
according to the thicknesses and the dielectric constant of the first geological layer to a $i-1^{th}$ geological layer, and the echo signal received by any one $R_j$ of the n receiving antennas ($R_1$, $R_2$, $R_3$), establish a pair of equations consisting of two equations, wherein the first equation is associated with the propagation time, the transmission speed of the electromagnetic pulse signal and the thickness of the $i^{th}$ geological layer, and the second equation is associated with the incident angle and refraction angle of the electromagnetic pulse signal at the $i^{th}$ interface and the transmission speed;
for two of the n pairs of equations, constitute a system of four equations, from which the transmission speed $v_1$ of the electromagnetic pulse signal in the $i^{th}$ geological layer and the thickness $D_1$ of the $i^{th}$ geological layer are calculated; and
calculate a dielectric constant $\varepsilon_i$ of the $i^{th}$ geological layer by using the transmission speed $v_i$ for the electromagnetic pulse signal in the $i^{th}$ geological layer.

11. The ultra-wideband carrier-free pulse radar system of claim 10, wherein $n \geq 3$; the data processing system is further configured to
constitute $C_n^2$ systems of equations, and for any one of the $C_n^2$ systems of equations, calculate the transmission speed $v_i$ of the electromagnetic pulse signal in the $i^{th}$ geological layer and the thickness $D_i$ of the $i^{th}$ geological layer;
for the $C_n^2$ calculated transmission speeds $v_i$ and thicknesses $D_i$, calculate an average of the transmission speeds $v_i$ and an thicknesses $D_i$.

12. The ultra-wideband carrier-free pulse radar system of claim 1, wherein n=3, 4, 5 or 6.

13. The ultra-wideband carrier-free pulse radar system of claim 1, wherein the extraterrestrial solid planet is one selected from the Moon, minor planet, Mars, satellites of Saturn, satellites of Jupiter and mini-satellites of Jupiter.

* * * * *